May 30, 1961 F. W. ROBSON ET AL 2,986,268
DISHWASHING MACHINE
Filed Jan. 15, 1959 3 Sheets-Sheet 1
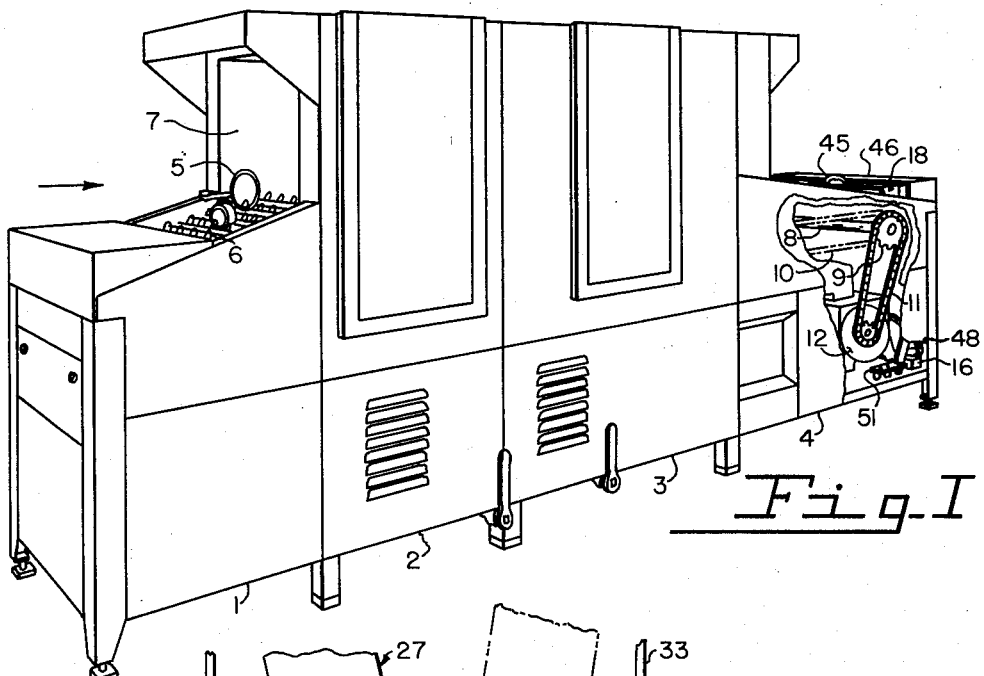
Fig. I
Fig. IV
INVENTORS
FREDERICK W. ROBSON
THOMAS R. SEAMAN
BY
Marshall, Marshall & Yeasting
ATTORNEYS

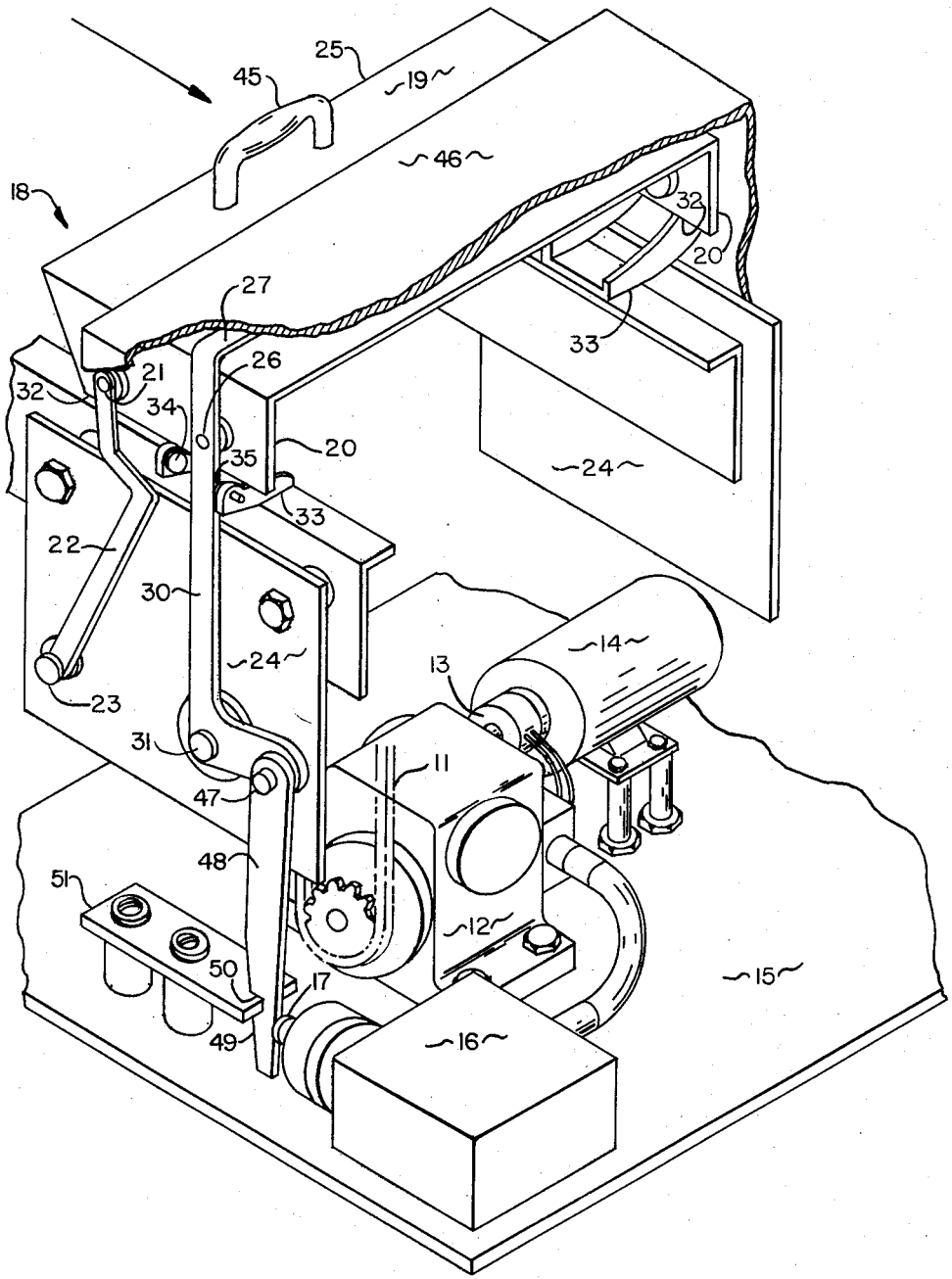
Fig. II
INVENTORS
FREDERICK W. ROBSON
THOMAS R. SEAMAN

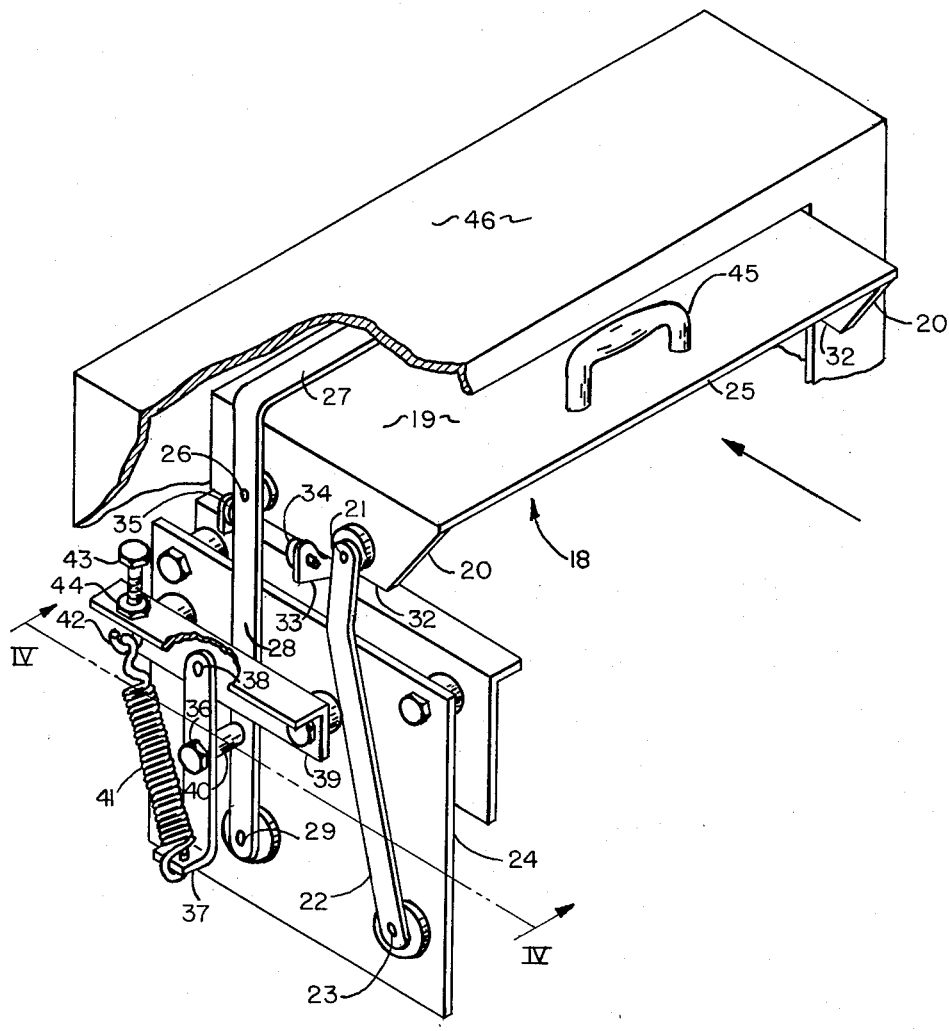
Fig. III

United States Patent Office 2,986,268
Patented May 30, 1961

2,986,268

DISHWASHING MACHINE

Frederick W. Robson and Thomas R. Seaman, Rochester, N.Y., assignors to Toledo Scale Corporation, Toledo, Ohio, a corporation of Ohio Filed Jan. 15, 1959, Ser. No. 786,958

3 Claims. (Cl. 198—232)

This invention relates to dishwashers and more particularly to commercial dishwashers of the continuous, rackless conveyor type.

In dishwashers of the rackless conveyor type, articles to be washed are placed directly upon the conveyors and are held in an essentially upright position during their travel through the dishwashers. Such articles are removed from the conveyors at the unloading ends of the dishwashers by the machine operators before the continuous conveyors begin to negotiate the turns at the unloading ends.

Difficulty has been experienced in prior rackless type dishwashers when articles were inadvertently not removed at the unloading ends even though such dishwashers were equipped with safety stop mechanisms. Such mechanism often did not function to stop the conveyors before the articles became jammed in the machines and usually required considerable effort on the part of the operators in freeing articles which jammed against the safety mechanism itself.

It is, accordingly, the principal object of this invention to provide, in a dishwasher of the continuous, rackless conveyor type, simplified safety stop mechanism for stopping the conveyor automatically, when articles upon the conveyor are inadvertently not removed at its unloading end, before such articles become jammed in the dishwasher.

Another object is to provide, in such a dishwasher, improved safety stop mechanism which automatically operates when contacted and is moved slightly by an article inadvertently left upon the conveyor at its unloading end to stop the conveyor immediately before such article becomes jammed in the dishwasher.

A further object is to provide, in such a dishwasher, safety stop mechanism which operates when contacted by an article inadvertently left upon the conveyor at its unloading end to stop the conveyor immediately and which automatically frees itself from such article so that the article can be removed from the conveyor with a minimum of effort.

It is also an object to provide, in such a dishwasher, safety stop mechanism which operates when contacted and is moved slightly by an article upon the conveyor to stop the conveyor immediately and which is easy to reset to restart the conveyor.

Other objects and advantages will be apparent from the following description of a preferred form of the invention.

According to the invention, a commercial dishwasher of the continuous, rackless conveyor type is provided with a safety stop mechanism that includes a member which is held in one of two positions by means of toggle spring apparatus. The member is located in a cocked position at the unloading end of the dishwasher where it obstructs articles inadvertently not removed by the machine operator. On slight movement of the member by contact of an article upon the conveyor, the member is snapped to a tripped position by the toggle spring apparatus as soon as it gets past its dead center position and immediately causes the conveyor to be stopped before the article has time to get jammed in the dishwasher. In such tripped position, the member is free of the article so that the machine operator can remove the article with one hand without touching the member. Return of the member to its cocked position under the combined actions of hand pressure and force exerted by the toggle spring apparatus as soon as it passes its dead center position causes the conveyor to be started up again automatically.

A preferred embodiment of the invention is illustrated in the accompanying drawings.

In the drawings:

Fig. I is a perspective view of a commercial dishwasher of the continuous, rackless conveyor type embodying the safety stop mechanism of the invention, part of the dishwasher being broken away to reveal such stop mechanism;

Fig. II is an enlarged view of the safety stop mechanism as seen from a position at the right hand corner of the dishwasher which is illustrated in Fig. I looking toward the broken away part of the dishwasher;

Fig. III is a view of the safety stop mechanism as seen from a position at the upper corner of the safety stop mechanism which is illustrated in Fig. II looking toward the safety stop mechanism; and Fig. IV is a fragmentary, elevational view as seen from a position along line IV—IV of Fig. III looking in the direction indicated by the arrows, illustrating in solid lines the tripped position of the safety stop mechanism and in broken lines the cocked position of the safety stop mechanism.

These specific figures and the accompanying description are intended merely to illustrate the invention and not to impose limitations on the claims.

Referring to Fig. I, a commercial dishwasher of the continuous, rackless conveyor type is illustrated which includes a loading unit 1, a prewash compartment 2, a wash and final rinse compartment 3, and an unloading unit 4. Dishes or other articles 5 to be washed are placed upon a rackless conveyor 6 at the loading unit 1 and are carried through an entrance opening 7 into the prewash compartment 2 where they are cleansed of food particles by recirculating water. Upon completion of the prewashing step, the dishes are successively washed with soapy or detergent-containing recirculating water and rinsed with fresh hot water in the wash and final rinse compartment 3. Upon completion of the rinsing step, the dishes are delivered through an exit opening to the unloading unit 4 from which they are removed.

A driven shaft (not hown) provided with sprockets (not shown) is mounted at the loading end and a similar shaft 8 supporting a pair of sprockets 9, only one of which is shown, is mounted at the unloading end, the latter shaft being power-driven. Continuous chains 10 extend around the sprockets forming side members of the rackless conveyor 6. The rackless conveyor 6 is shown and described in detail in copending U.S. application Serial No. 744,552 filed on June 25, 1958 in the name of Frederick W. Robson.

The sprocket 9 which is illustrated in Fig. I is connected by means of a drive chain 11 to a reducer 12 which is driven through a magnetic clutch 13 (Fig. II) by a motor 14, the reducer 12 and motor 14 being supported by a frame member 15 of the dishwasher. The reduction ratio is in the order of 441:1. The magnetic clutch 13 is controlled by means of a micro switch 16 operatively connected thereto which switch has a plunger 17 for operating it.

Ordinarily, the dishes 5 are removed from the conveyor 6 by the operator before the conveyor begins to negotiate the turn at the sprockets 9. In the event that a dish is inadvertently not removed at the unloading end of the machine it will contact a safety stop member 18 which is mounted in obstructing position in the path of such dish, the stop member being at all times in nonobstructing position relative to the conveyor 6.

The safety stop member 18 has a flat portion 19 with depending side skirts 20 each of which is pivotally attached at 21 to a bar 22 that in turn is pivotally attached at 23 to a side frame member 24 of the dishwasher, there being a side frame member 24 located one at each side of the conveyor 6. A leading edge 25 of the flat portion 19 extends between the side skirts 20 transversely across the conveyor 6 at the unloading end of the machine. As indicated by the arrows in Figs. II and III, in the event that a dish is not removed from the conveyor at its unloading end it will contact the leading edge 25 of the stop member 18. Each of the depending side skirts 20 of the stop member 18 also is pivotally attached at 26 to a leg of an inverted, flat-bottom U-shaped member 27, leg 28 (Fig. III) of the U-shaped member 27 being straight and is pivotally attached to the side frame member 24 at 29 and leg 30 (Fig. II) of the U-shaped member 27 being in the form of a bell crank and is pivotally attached at 31 to the side frame member 24. The lower edges 32 of the skirts 20 of the safety stop member 18 are slidable on brackets 33, secured to the side frame members 24, between cocked position stops 34 and tripped position stops 35 which are carried by such brackets, one or the other of the pairs of stops 34 and 35 contacting the legs of the U-shaped member 27 to limit movement of the U-shaped member.

The straight leg 28 of the U-shaped member 27 is pivotally attached by means of a shoulder bolt 36 to a lever 37 which is fulcrumed at 38 on a stationary bracket 39 that is fixed to the side of one of the frame members 24, a spacer 40 on the bolt 36 separating the lever 37 from the leg of the U-shaped member. The end of the lever 37 remote from the fulcrum point 38 is attached to an end of a toggle spring 41 which has its other end hooked on a hook 42 positionably attached to the bracket 39 by means of a bolt 43 and nuts 44. The tension in the toggle spring 41 is adjusted by moving the bolt 43 up or down.

Referring to Fig. IV, the lever 37 which is connected to the tension coil spring 41 at its end remote from its fulcrum and which is pivotally connected intermediate its ends to the straight leg 28 of the U-shaped member 27 is a part of a toggle device that is comprised of the lever, the toggle spring 41 and the leg 28 and that operates either side of the "Dead Center" position line, which is defined by a line passing through fulcrum point 38 and the ends of the spring 41 when the toggle mechanism is in its "cocked" position hereinafter defined, to urge the U-shaped member 27 against one or the other of the pairs of stops 34 and 35. Normally the toggle mechanism and the safety stop member 18 attached thereto by its pivotal connections at 26 to the legs of the U-shaped member 27 are in their positions which are indicated by the broken lines. This is the "cocked" position; it is attained by grasping a handle 45 on the safety stop member 18 and moving it to the right as viewed in Fig. IV. Movement of the toggle mechanism into the cocked position pivots the U-shaped member 27 clockwise about the axis of pivot points 29 and 31 and the lever 37 counterclockwise about the axis of its pivot fulcrum point 38. As soon as the hand pressure on the handle 45 moves the centerline 41a of the spring 41 through the fulcrum point 38, the spring provides the cocking action and urges the U-shaped member 27 by means of its operative connection thereto toward the cocked position stops 34. The position of the centerline 41a relative to the Dead Center line in the cocked position of the toggle is shown in Fig. IV.

The toggle mechanism in its cocked position is just past its Dead Center position so that very little pressure by a dish 5 upon the conveyor 6 moves the mechanism back past such center position whereupon the mechanism pops over or snaps against stops 35 into its "tripped position" which is its position shown in solid lines in Fig. IV. The toggle spring 41 provides the cocking action and is tripped when the line of tension, i.e., its centerline 41a passes through the fulcrum point 38. Movement of the toggle mechanism into the tripped position pivots the U-shaped member 27 counterclockwise about the axis of pivot points 29 and 31 and the lever 37 clockwise about the axis of its pivot fulcrum point 38. Hence, the toggle spring 41 operates either side of the Dead Center position to keep the safety stop member 18 under spring pressure both in the cocked and tripped positions. This pressure is adjusted by moving the bolt 43 up or down so that the mechanism will trip on slight contact of a dish with the leading edge 25 of the safety stop member 18. When the safety stop member 18 pops over or snaps into its tripped position it moves out of contact with the actuating dish since the dish is carried by the conveyor 6 which is relatively slow moving because of the reduction ratio (in the order of 441:1) imparted by the reducer 12. Most of the safety stop member 18 and the mounting means therefor is hidden by means of a stationary housing 46 that gives a neat appearance to the unloading end of the dishwasher.

Bell crank leg 30 of the U-shaped member 27 is pivotally connected at 47 (Fig. II) to a switch-actuating bar 48 that has a tapered edge 49 which is slidable in a slot 50 in a plate 51 secured to frame member 15. Downward movement of the bar 48 in the slot 50 causes the bar to be cammed against the operating plunger 17 of the micro switch 16 which controls the magnetic clutch 13. The safety stop member 18 is shown in its tripped position in Fig. II. In such tripped position the switch-actuating bar 48 is in its down position wherein it operates the plunger 17 of the micro switch 16 which through its operative connection with the magnetic clutch 13 causes deenergization of the clutch. Deenergization of the clutch disconnects the motor 14 from the reducer 12 which causes the conveyor 6 to stop. Upon the operator removing the dish or dishes which tripped the toggle mechanism and then returning the safety stop member 18 to its cocked position, the pressure of the switch-actuating bar 48 on the plunger 17 of the micro switch 16 is removed and the conveyor 6 automatically starts moving again.

The magnetic clutch 13 is not shown in detail because it is of conventional design; commercially available magnetic clutches are adjustable to enable them to slip if a jam occurs anywhere in the dishwasher. The magnetic clutch 13 is particularly useful in combination with the safety stop mechanism of the invention because it enables the conveyor to be stopped immediately when dishes are inadvertently not removed at the unloading end of the dishwasher. However, a mechanical clutch may be substituted for the magnetic clutch and the micro switch 16 may be connected to the motor 14 to turn it on and off if this arrangement is found desirable. Furthermore, this is accomplished by toggle mechanism of simple, low cost design which nevertheless is of rugged construction to withstand the wear of heavy commercial use.

Another feature of the safety stop mechanism of the invention is the popping over of the safety stop member 18 into its tripped position out of contact with the actuating dish. This permits the operator to remove the actuating dish or dishes and any others that are necessary with one hand, the safety stop member being completely free of the dishes. Heretofore, it was necessary for the operator to exert considerable effort in freeing the dishes from the safety stop mechanism of prior dishwashers, since such dishes jammed against such stop mechanism. The operator of many prior dishwashers had to pivot spring loaded stop mechanism out of contact with the dishes and at the same time remove the dishes. In contrast, the safety stop mechanism of the invention automatically frees itself from the actuating dishes by popping over to its tripped position. Therefore, the operator merely lifts the dishes from the stopped conveyor 6 without having to touch the safety stop mechanism and then by hand pressure on the handle 45 resets the toggle mechanism with little effort to its cocked position whereupon the conveyor 6 starts up automatically.

Various modifications in details of construction may be made without departing from the spirit and scope of the invention.

Having described the invention, we claim:

1. In a dishwasher, a frame, a continuous conveyor carried by the frame and having an unloading section, the conveyor functioning to transport articles through the dishwasher, drive means for driving the conveyor, a switch for stopping and starting said drive means, a switch operator, and safety stop mechanism mounted on the frame at the unloading section of the conveyor, said stop mechanism comprising a member which is operatively connected to the switch operator and which is movable between a cocked position, wherein it is in an obstructing position relative to articles inadvertently left upon the unloading section of the conveyor, and a tripped position, wherein the switch operator operates said switch to stop the conveyor, an arm pivotally connected both to the frame and to the member and toggle spring means defining a dead center position and connected to the arm, the toggle means being past the dead center position toward the cocked position when the member is in its cocked position and functioning to move the member into its tripped position whenever the toggle means is driven by the arm connecting the member to the toggle means through the dead center position toward the tripped position.

2. In a dishwasher, a frame, a continuous conveyor carried by the frame and having an unloading section, the conveyor functioning to transport articles through the dishwasher, drive means for driving the conveyor, a switch for stopping and starting said drive means, a switch operator and safety stop mechanism mounted on the frame at the unloading section of the conveyor, said stop mechanism comprising a member which is operatively connected to the switch operator and which is movable in a path between a cocked position, wherein it is in an obstructing position relative to articles inadvertently left upon the unloading section of the conveyor, and a tripped position, wherein the switch operator operates said switch to stop the conveyor, an arm pivotally connected both to the frame and to the member, a lever fulcrumed on the frame and a toggle spring connected between the frame and the end of the lever remote from its fulcrum point on the frame, the lever being pivotally connected intermediate its ends to the arm, whereby the member is held under spring force in either of said positions, an article left upon the unloading section of the conveyor driving the member out of said cocked position a distance small relative to said path whereupon the spring force moves it the rest of the way into said tripped position to stop the conveyor, the member being reset by manual force into said cocked position to restart the conveyor.

3. A dishwasher according to claim 2 wherein means are provided for selectively varying the spring force so that the safety stop mechanism trips on slight contact of an article upon the conveyor against the member.

References Cited in the file of this patent
UNITED STATES PATENTS 2,644,473 Fox et al. _____ July 7, 1953

FOREIGN PATENTS 781,733 Great Britain _____ Aug. 21, 1957